(12) United States Patent
Gregory et al.

(10) Patent No.: US 10,524,614 B2
(45) Date of Patent: Jan. 7, 2020

(54) POWERED COOKING ACCESSORY FOR AN OVEN CAVITY

(71) Applicant: Whirlpool Corporation, Benton Harbor, MI (US)

(72) Inventors: Christopher A. Gregory, St. Joseph, MI (US); Nathan C. Wier, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 28 days.

(21) Appl. No.: 14/871,337

(22) Filed: Sep. 30, 2015

(65) Prior Publication Data

US 2016/0095469 A1    Apr. 7, 2016

Related U.S. Application Data

(60) Provisional application No. 62/060,919, filed on Oct. 7, 2014.

(51) Int. Cl.
*A47J 36/32*    (2006.01)
*A47J 37/04*    (2006.01)
(Continued)

(52) U.S. Cl.
CPC .............. *A47J 36/32* (2013.01); *A47J 37/041* (2013.01); *A47J 37/06* (2013.01)

(58) Field of Classification Search
CPC .......... A47J 36/32; A47J 37/041; A47J 37/06; F24C 7/06; F24C 15/166; H01R 13/642; H01R 13/6608; H01R 13/6683; Y10S 439/913

USPC .......... 99/449, 340, 342, 325; 219/403, 763, 219/395, 398, 506, 541, 452.13, 536, 219/447.1, 448.12, 416, 396, 446.1; 126/337 R, 374.1; 710/15, 104, 11, 16,
(Continued)

(56) References Cited

U.S. PATENT DOCUMENTS 1,208,637 A    12/1916 Phelps
2,024,386 A    12/1935 Phelps
(Continued)

FOREIGN PATENT DOCUMENTS

EP    1796435 A2    6/2007
EP    1796435 A3    12/2007
(Continued)

OTHER PUBLICATIONS

European Search Report dated Feb. 25, 2016 for Application No. 15188668.6-1656, 6 pages.

*Primary Examiner* — Dana Ross
*Assistant Examiner* — Joseph M Baillargeon
(74) *Attorney, Agent, or Firm* — Price Heneveld LLP (57) ABSTRACT

A powered cooking accessory for use in an oven includes a body receivable within an interior of the oven and a first electronic device received within a portion of the body. The accessory further includes a device coupling extending from the body and having a power coupling exposed thereon and electrically connected with the electronic device. The device coupling has an identification element encoded with information regarding at least one characteristic of the accessory and is coupleable with the oven to receive electrical power from the oven and to communicate the information encoded with the identification element to the oven.

19 Claims, 4 Drawing Sheets

(51) Int. Cl.
*A47J 37/06* (2006.01)
*F24C 7/06* (2006.01)
*F24C 15/16* (2006.01)

(58) Field of Classification Search
USPC ..... 710/62, 72, 8, 10; 381/74; 439/222, 955; 455/569.1
See application file for complete search history.

(56) References Cited

U.S. PATENT DOCUMENTS

| | | | |
|---|---|---|---|
| 2,668,222 A | 2/1954 | McCormick | |
| 2,798,930 A | 7/1957 | Frost | |
| 3,265,861 A | 8/1966 | Perlman | |
| 5,272,317 A | 12/1993 | Ryu | |
| 5,618,458 A | 4/1997 | Thomas | |
| 6,114,665 A | 9/2000 | Garcia et al. | |
| 6,362,458 B1 | 3/2002 | Sargunam et al. | |
| 7,189,950 B2 | 3/2007 | Ko | |
| 7,368,685 B2 | 5/2008 | Nam et al. | |
| 7,781,702 B2 | 8/2010 | Nam et al. | |
| 7,828,586 B2 * | 11/2010 | Gorczyca | H01R 13/53 439/489 |
| 8,299,656 B2 | 10/2012 | Allard et al. | |
| 2007/0251936 A1 * | 11/2007 | Nam | F24C 15/166 219/413 |
| 2009/0104811 A1 * | 4/2009 | Sumida | H01R 13/72 439/501 |
| 2011/0248021 A1 * | 10/2011 | Gutierrez | F24C 15/16 219/620 |
| 2012/0067334 A1 * | 3/2012 | Kim | F24C 15/34 126/39 R |
| 2015/0096974 A1 * | 4/2015 | Freeman | F24C 1/06 219/485 |

FOREIGN PATENT DOCUMENTS

| | | | | |
|---|---|---|---|---|
| GB | 1433354 A | * | 4/1976 | ........... F24C 15/101 |
| KR | 20030082623 A | | 10/2003 | |

* cited by examiner

POWERED COOKING ACCESSORY FOR AN OVEN CAVITY

CROSS REFERENCE TO RELATED APPLICATION

This patent application is claiming the priority of U.S. Provisional Patent Application No. 62/060,919, filed on Oct. 7, 2014, entitled "POWERED COOKING ACCESSORY FOR AN OVEN CAVITY", the entire contents of which is hereby incorporated by reference in its entirety.

FIELD OF THE INVENTION

The present invention generally relates to powered cooking accessories for use with ovens and, more specifically, to powered cooking accessories capable of providing information regarding a characteristic thereof to an oven.

BACKGROUND OF THE INVENTION

Various types of cooking instruments and accessories can be used within an oven. Some ovens include capability to provide power to specifically-adapted powered cooking accessories, such as by providing a power outlet. The types of accessories and the control thereof may be limited by the range of power output provided by the oven. Accordingly, it may be useful to provide a powered accessory useable in a system with an oven wherein communication between the accessory and an oven is facilitated such that the oven can provide specific functionality related to control of the accessory.

SUMMARY OF THE INVENTION

According to one aspect of the present invention, a powered cooking accessory for use in an oven includes a body receivable within an interior of the oven and a first electronic device received within a portion of the body. The accessory further includes a device coupling extending from the body and having a power coupling exposed thereon and electrically connected with the electronic device. The device coupling has an identification element encoded with information regarding at least one characteristic of the accessory and is coupleable with the oven to receive electrical power from the oven and to communicate the information encoded with the identification element to the oven.

According to another aspect of the present invention, a cooking system includes an oven defining an interior cavity and including a connection port on a surface of the interior cavity and a powered cooking accessory. The powered cooking accessory includes a body receivable within the interior cavity of the oven and a first electronic device coupled with the body. A device coupling extends from the body and has a power coupling exposed thereon electrically connected with the electronic device. The device coupling further includes an identification element encoded with information regarding at least one characteristic of the accessory. The device coupling is receivable by the connection port such that the connection port provides electrical power to the power coupling and receives the information encoded with the identification element.

According to another aspect of the present invention, a method for operating a cooking system includes receiving information from a powered cooking accessory positioned within an interior cavity of an oven. The powered cooking accessory includes a body receivable within an interior of the oven, a first electronic device coupled with the body, and a device coupling extending from the body. The method further includes determining at least one characteristic of the powered cooking accessory and providing electrical power to the electronic device by an electrical coupling between the device coupling and a connection port within the interior cavity of the oven at a predetermined output level based on the at least one characteristic thereof.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
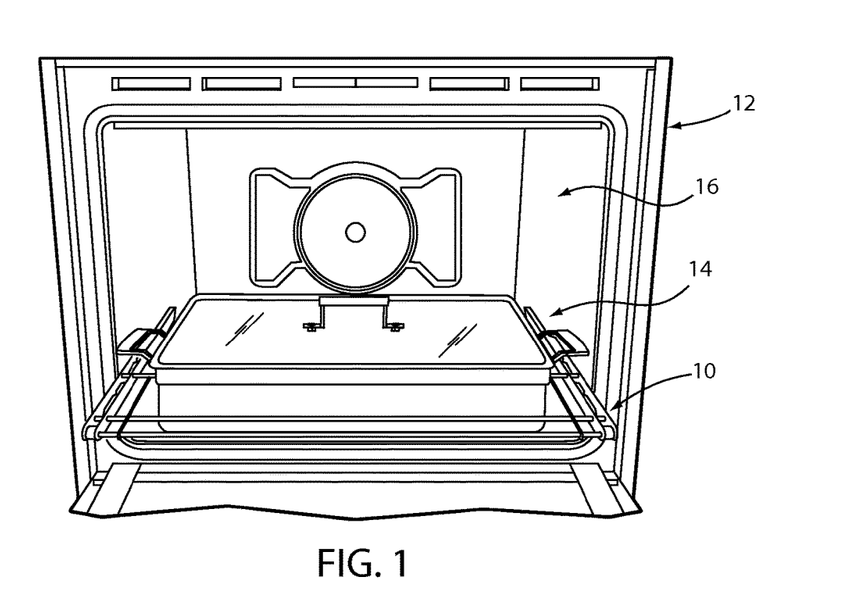
FIG. 1 is a front perspective view of a cooking accessory within an interior of an oven.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
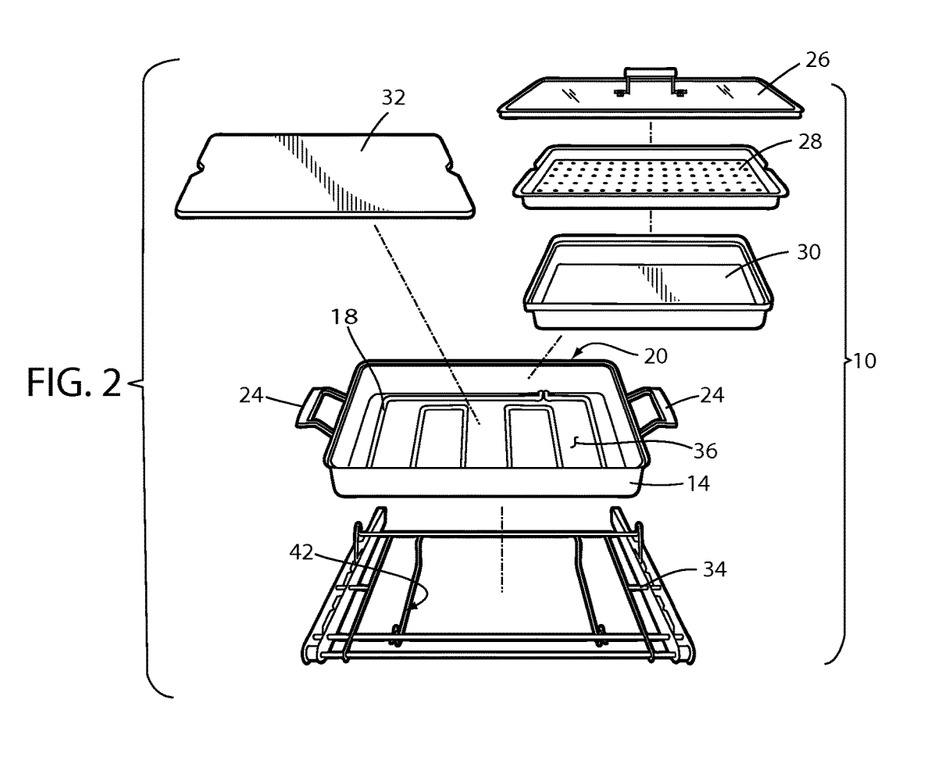
FIG. 2 is an assembly view of a cooking accessory having various configurable components.

Referring to FIG. 1, reference numeral 10 generally designates a powered cooking accessory for use with oven 12. Accessory 10 includes a body receivable within the interior 16 of oven 12. In FIG. 1, body 14 is in the form of a cooking vessel 14, other examples of bodies defining other types of accessories being disclosed below. Accessory 10 also includes an electronic device, which is illustrated in FIG. 2 in the form of an electric heating element 18, other examples thereof being also discussed below. A device coupling 20 (FIG. 7) extends from cooking vessel 14 (or other examples of the accessory body) and includes a power line (not shown) extending therethrough and electrically connected with the heating element 18 (or other examples of the electronic device). Device coupling 20 further includes an identification element 22 (FIG. 6) configured to communicate information regarding at least one characteristic of the accessory to the oven 12.

Figure 5:
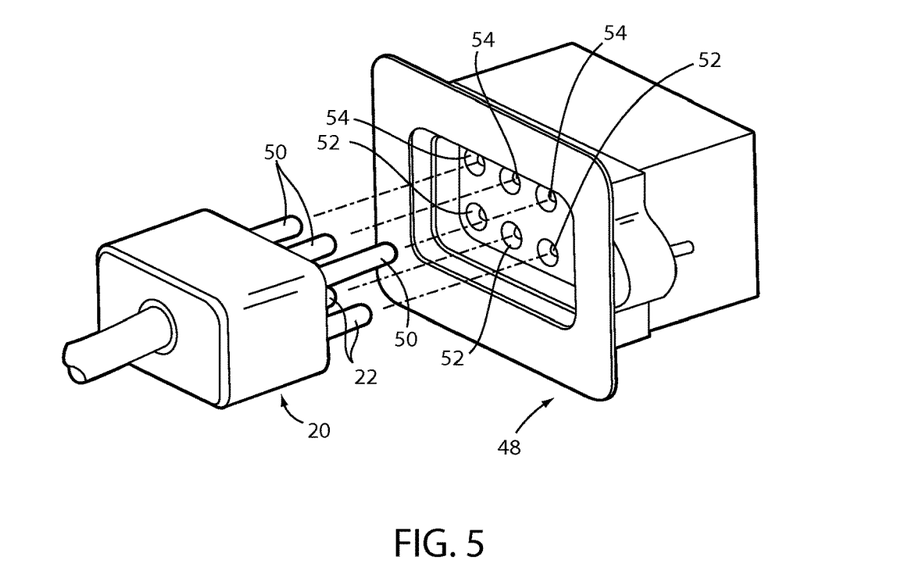
FIG. 5 is a detail view of the connection port of FIG. 4.

As shown in FIG. 1, cooking vessel 14, which is one example of a body type for accessory 10, can be a tray-like, or pan-like structure including handles 24 and a lid 26 that can be used to enclose vessel 14. In an example, vessel 14, including lid 26 can be in the form of a steamer unit, which can incorporate a perforated steam tray 28 and a water basin 30, as shown in FIG. 5. As further shown in FIG. 2, cooking vessel 14 can be reconfigurable, such as by incorporating a cooking stone 32, which may be received within vessel 14 in place of tray 28 and water basin 30, and may be used with or without lid 26 in place. Other modular devices can be incorporated for use with vessel 14, including grill grates, grill pans, clay oven inserts, or the like. As further shown in FIG. 2, vessel 14 can be assembleable with a glider rack 34 that can be assembled within interior 16 of oven 12. Glider rack 34 can slidably couple vessel 14 within interior 16 of oven 12 to provide sliding access to vessel 14.

As mentioned above, vessel 14 can include an electronic device in the form of an electric heating element 18 that can be coupled with vessel 14 adjacent a lower surface 36 thereof. Accordingly, heating element 18 can be positioned beneath water basin 30 or, alternatively, beneath cooking stone 32 (or other modular device assembleable with vessel 14) to provide a heat source specific to vessel 14 in addition to or as an alternative to a general heat source provided within oven 12.

Figure 3:
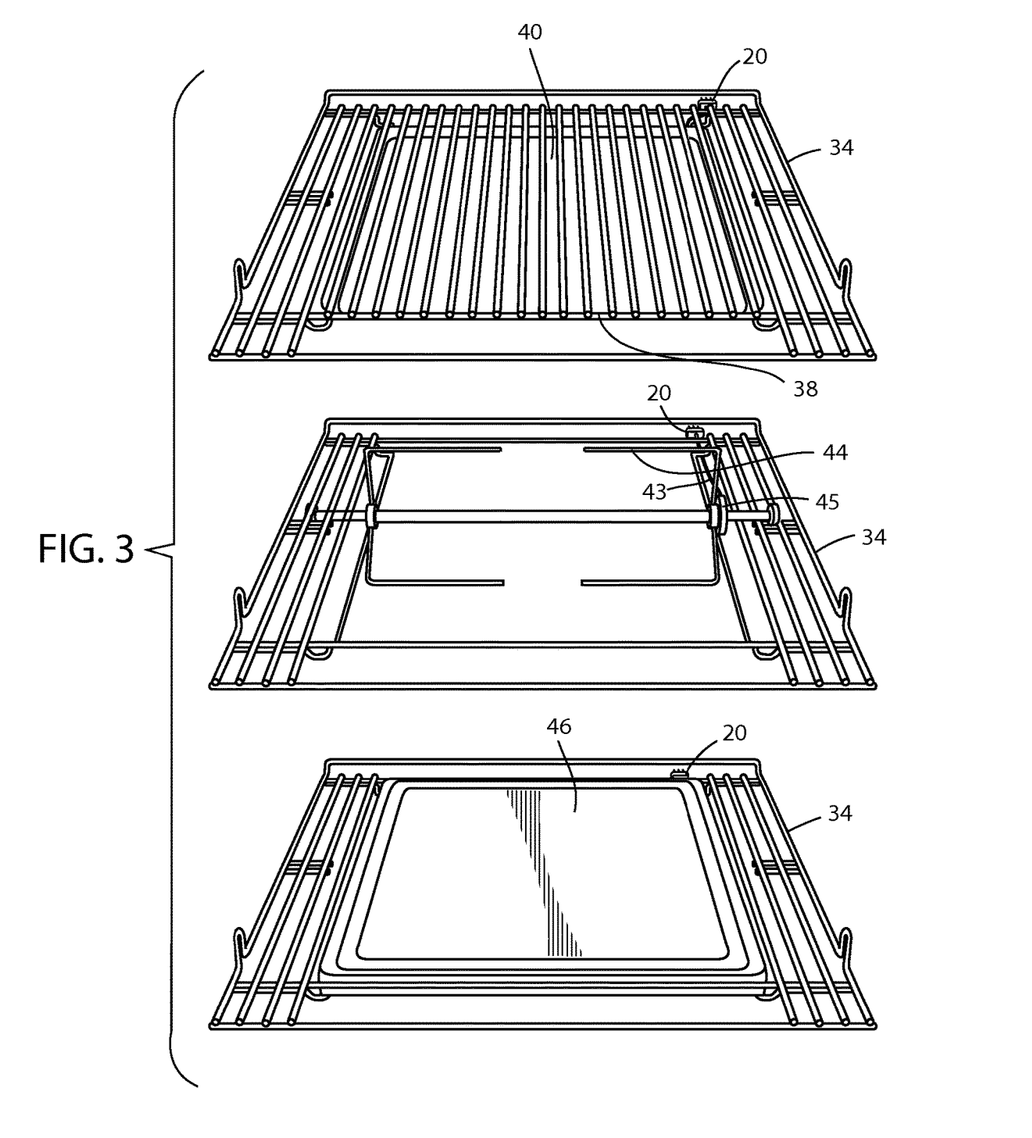
FIG. 3 is an assembly view of a variation of the cooking assembly of FIG. 2.

As shown in FIG. 3, various other types of bodies can be assembled directly with glider rack 34 in place of vessel 14. In one example, a combination drip pan 38 and grill grate 40 can be assembleable within a receiving portion 42 of glider rack 34. Drip pan 38, for example, can incorporate an electronic device therein in the form of a heating element internal thereto (not shown). Additionally, a rotisserie unit 44 can be assembled so as to be positioned in receiving portion 42, and can include an electronic device in the form of a motor 45 to drive rotation thereof. Further, a standalone, powered cooking stone 46 with an associated heated cooking surface can be assembleable within receiving portion 42 of glider rack 34 and can include an electronic device in the form of an integrated, internal heating element.

Figure 4:
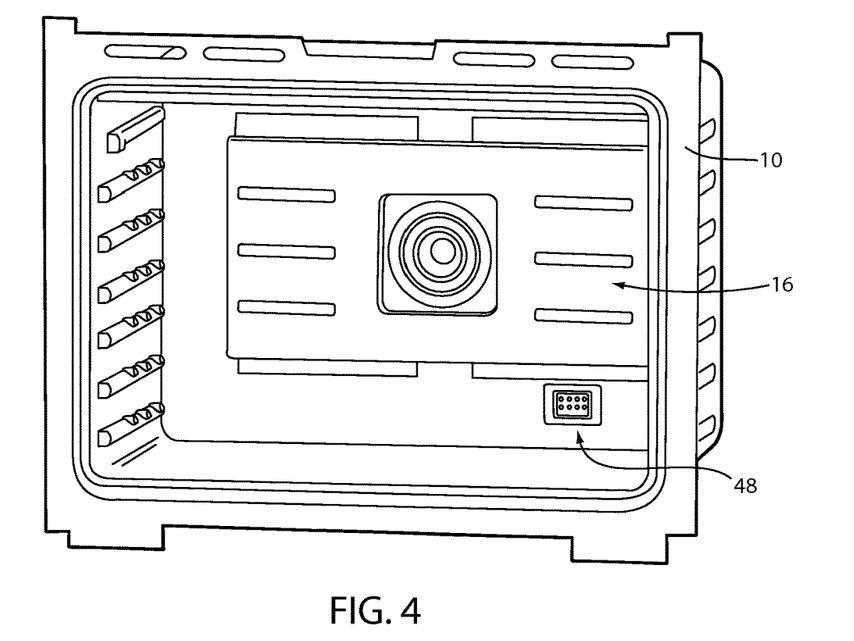
FIG. 4 is a front perspective view of an interior of an oven including a connection port therein.

The various types of electronic devices included with vessel 14, grill grate 40, rotisserie, or stone 46, for example, can be powered by oven 12 by connection of device coupling 20 with a mating connection port 48 within interior 16 of oven 12, as shown in FIG. 4, and schematically in FIG. 5. The device coupling 20 can comprise a connector, shown schematically in FIG. 6 that can be mounted to and extend directly from the body itself (as illustrated with respect to coupling 120 according to the embodiment shown in FIG. 7) or can be mounted on the end of a connection cable 43 extending from the body. Device coupling 20 can include a plurality of pins or other conductive features that can include power supply pins 50 for connection with the above-mentioned power supply wires, which may be internal to device coupling 20, as well as the particular body (e.g. vessel 14, grill grate 40, rotisserie, or stone 46) and/or any cable between coupling 20 and the body.

Figure 6:
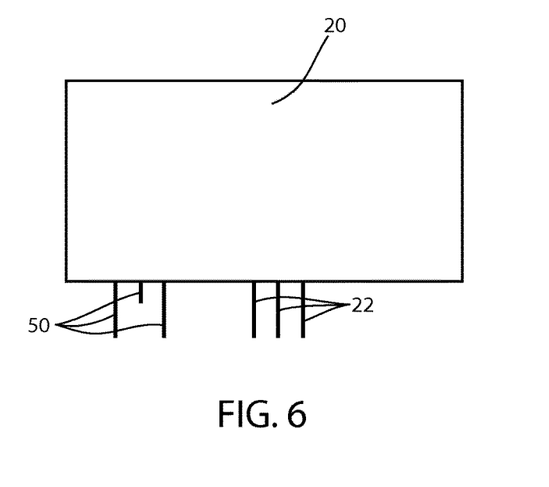
FIG. 6 is a schematic view of a device coupling connectable with the connection port of FIG. 5.

As shown in FIG. 5, connection port 48 can include power connections 52 that correspond to power supply pins 50 and are electrically coupleable therewith such that oven 12 can provide electrical power thereto. Once device coupling 20 and connection port 48 are coupled together, oven 12 can provide electrical power for the particular electronic device, such as heating element 18 (or other internal heating elements) or the motor 45 associated with rotisserie 44. Further, device coupling 20 can include an identification element that can communicate to oven 12 at least one characteristic of the accessory 10 with which the particular coupling 20 is connected. In the embodiment shown in FIG. 5, the identification element can be in the form of identification pins 22, which can be mechanically and/or electrically coupleable with communication elements 52 in connection port 48, which are shown in FIG. 5 as connection receptacles 54 which can receive pins 22 therein. In various examples, identification pins 22 can be the same pins as power supply pins 50, can be different from power supply pins, or various combinations thereof. As shown in FIGS. 5 and 6, the power supply pins 50 and identification pins 22 can be distributed within respective groups of pins on device coupling 20.

Identification pins 22 can be operable to communicate information regarding a characteristic of accessory 10, including the particular type of body (e.g., vessel 14, grill grate 40, rotisserie, stone 46, or other types of bodies which may be available) used in a configuration of accessory 10. Such information may further be related to the type of electronic device, such as various types of heating elements 18 (or internal heating elements) included therein, motors (such as that associated with rotisserie 44) or other electronic devices (such as a thermometer or the like). Further characteristics may include a particular configuration of an accessory 10, such as whether vessel 14 is assembled with water basin 30 and tray 28 or with cooking stone 32, which vessel 14 may be configured to identify based on included mechanical switches, electronic circuitry or combinations thereof.

An oven, such as oven 12 in FIGS. 1 and 2, can be configured to operate in a system with accessory 10 by using the information communicated by coupling 20 regarding the accessory 10 characteristic (or characteristics) to provide customized, user-selectable options, which may, for example, be presented to a user in the form of a list or the like, the list being pre-selected to correspond to the accessory 10 type. In an example, when accessory 10 is identified as including vessel 14 with water basin 30 and tray 28 therein, electronic circuitry within oven 12, can be programmed to identify the type of accessory 10 and to present to a user various pre-selected cooking options related to cooking using steam. Further, such options may relate to specific power levels to-be provided to accessory 10 in order to operate heating element 18 according to the particular size and configuration thereof within a desired range of temperatures for steam cooking with water basin 30 and tray 28 present in vessel 14. In other examples, when accessory 10 is identified as including stone 46, options related to baking (e.g. various breads, pizzas, etc.) may be presented and oven 12 may adjust the power provided by power connections 52 to compensate for the desired temperature to which stone 46 is desired to be heated, as well as the power requirements of the included heating element 18 for heating within such a desired range. Other variations are possible, depending on the other examples of accessory 10 configurations and types discussed herein. In further examples, pre-programmed options can be made available for user selection of various types of food that can are intended to be cooked with the particular configuration of accessory 10 identified. Such selections can have corresponding, associated cook times and temperatures (and corresponding ranges of power output required to achieve such temperatures) that can be automatically implemented based on selection of one of such options.

As discussed above, identification pins 22 can be used to communicate such information to oven 12. In one example, the pins 22 can each have a respective length (e.g., short or long, or short, medium, and long), that can be selected in a configuration to encode information related to the type and/or configuration of accessory 10 by the various lengths of the pins 22, as depicted, for example, in FIGS. 5 and 6. As discussed above, the encoded information may depend on the specific one of the various bodies (e.g. with vessel 14, grill grate 40, rotisserie 44, stone 46, etc.) with which device coupling is included. Connection port 48 can include mechanical switches or sensors within communication elements 54 that can determine the configuration of pins 22 and oven 12 can include electronic circuitry or mechanical switches that can decode the information based on the particular pin length arrangement to identify the body used with accessory 10 based on the identified pin configuration in accordance with a predetermined reference scheme.

In another embodiment, pins 22 can be of the same or similar configuration, regardless of the type of body (e.g., vessel 14, grill grate 40, rotisserie 44, stone 46, or other types of bodies which may be available) and may be connected with circuitry included within, for example, device coupling 20 to transmit a signal to oven 12, through communication elements 54 regarding the specific type or configuration of the body or accessory 10. For example, such circuitry can include a computer chip with specific information programmed therein or defining a specific electronic "fingerprint." That can be permanently encoded on the chip (e.g. a passive radio-frequency identification ("RFID") chip or the like. Or can change depending on a particular user-selected configuration of the accessory 10 e.g. whether steamer basket 28 or cooking stone 32 is assembled with vessel 14 in the example of FIG. 2.

Figure 7:
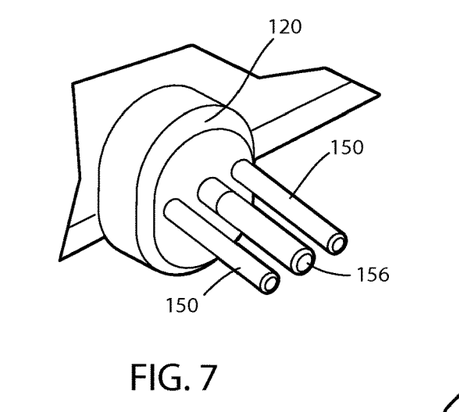
FIG. 7 is a variation of a device coupling.
Figure 8:
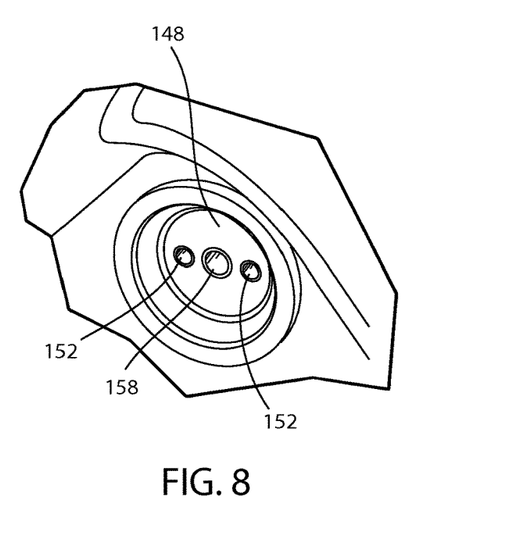
FIG. 8 is a variation of a connection port useable with the device coupling of FIG. 7.

As sown in FIGS. 7 and 8, in another example device coupling 122 can include power pins 150 and a ground pin 156 for mechanical and electrical connection with a corresponding connection port 148, including power connections 152 and a ground connection 158. In such an example, electronic circuitry can be included within device coupling 122 and within connection port 148. To communicate information regarding a type or configuration of a related accessory (such as accessory 10 and the various bodies useable therewith) through wireless means. Such circuitry can include passive or active RFID circuitry, various wireless communication devices according to various protocols (Bluetooth, ZigBee, WiFi, or the like), magnetic, electromagnetic, or inductive circuitry, ultrasonic transducers and receivers, or other similar circuitry.

In a variation of the embodiment of device coupling 122, shown in FIG. 7, ground pin 156 can be of a specific length to encode information regarding the type of body with which it is coupled to provide identification capability in a manner similar to the mechanical variation of pins 22, discussed above. In a further variation, both power pins 150 and ground pin 156 can be of respective lengths in combination to encode such information, as further described above.

According to another embodiment, a method for operating a cooking system, such as the cooking system of accessory 10 and oven 12 discussed above with respect to claims 1-6 is described. In particular, the method can include the oven 12 receiving information from accessory 10. As described above, accessory 10 can include a body 14 according to one of various possible body types. Accessory 10 can further include an electronic device 18 coupled with body 14 and a device coupling 20 extending from body 14. As discussed in the example of FIGS. 1 and 2, electronic device 18 can include a heating element that receiver power from oven 12 via device coupling 20, which is connectable with connection port 48 of oven 12. Once accessory 10 is connected with oven 12 by coupling of device coupling 20 with connection port 48, oven 12 can receive or otherwise read or decode the information regarding the accessory 10 that is encoded or otherwise stored within device 10 or, more particularly, within device coupling 20. Oven 12 can then provide electrical power to the electronic device 18 of accessory 10 by an electrical coupling between device coupling 20 and connection port 48 at a predetermined output level based on the characteristic of the accessory 10. As discussed above, the characteristic of the accessory 10 can include the type of accessory 10 (including the examples discussed above with respect to FIGS. 1-3) and the particular configuration of the electronic device 18, which may include the type of device (e.g. heating element, motor, or the like) the size or the location thereof within accessory 10.

As also discussed above with reference to FIGS. 5 and 6, device coupling 20 can include an identification element, such as the group of identification pins 22 illustrated in FIG. 5, for example, or one of the various wireless communication elements, a computer chip, or the like. In such an example, the oven 12 can receive the information regarding device 10 through connection with or other communication with device coupling 20 and, more particularly, with the identification element. In the example given wherein the identification element is in the form of the above-described identification pins 22, wherein the individual pins 22 can be of specific lengths to identify the accessory 10 type and/or electronic device 18 type, the oven 12 can measure the lengths of the pins 22, such as through identification contacts 54 in connection port 48, allowing oven 12 to compare the respective lengths of pins 22 with data stored within memory to identify the information encoded thereby.

As also discussed above, oven 12 can provide a list of cooking program options, such as by a display or the like on an exterior of oven 12 or by communication with a remote device, such as a smartphone, tablet, or the like. The cooking program options can be specifically tailored to the type of accessory 10, the configuration of the electronic device 18, or various combinations thereof, and can provide specific cooking durations, temperatures of electronic device 18 or the burners within oven 10, operation of electronic device 18 including a motor 45, or the like.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. In this specification and the appended claims, the singular forms "a," "an" and "the" include plural reference unless the context clearly dictates otherwise.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A powered cooking accessory for use in an oven, comprising:
    a rack portion having a width spanning a cavity of the oven to slidably engage within the cavity of the oven, the rack defining a receiving portion therein with an at least partially open rack area surrounding the receiving portion;
    a body removably positioned within the receiving portion of the oven rack;
    a first electronic device received within a portion of the body; and
    a device coupling extending from the body and having a power coupling exposed thereon and electrically connected with the electronic device, the device coupling having an identification element encoded with information distinguishing at least two fixed device characteristics of the accessory among a selection of accessories that may alternately be coupled with the oven and being coupleable with a connection port within the oven to receive electrical power from the oven, the information encoded with the identification element being communicated to the oven when the device coupling is coupled with the connection port;
    wherein the device coupling comprises a plurality of pins, at least some of the plurality of pins being included within the identification element and having respective lengths thereof configured to communicate the information regarding the at least one characteristic of the accessory by the connection port determining the lengths of at least some of the plurality of pins.

2. The powered cooking accessory of claim 1, wherein:
    the body defines a body type;
    the electronic device defines one of a device type or a device component configuration; and
    the information that distinguishes the at least two fixed device characteristics of the accessory among the selection of accessories includes at least two of the body type, the device type, and the device component configuration.

3. The powered cooking accessory of claim 2, wherein:
    the body type is such that the body defines a cooking surface;
    the device type includes a heating element; and
    the device component configuration includes the heating element being positioned beneath the cooking surface.

4. The powered cooking accessory of claim 2, wherein:
    the body type is such that the body defines a cooking vessel;
    the device type includes a heating element; and
    the device component configuration includes the heating element being positioned within the cooking vessel.

5. The powered cooking accessory of claim 2, wherein:
    the body type is such that the body defines a rotisserie; and
    the device type includes a motor; and
    the device component configuration includes the motor being operatively coupled with the rotisserie to drive rotation thereof.

6. The powered cooking accessory of claim 2, wherein:
    the body type is such that the body defines a grill grate; and
    the device type includes a heating element; and
    the device component configuration includes the heating element being positioned beneath the grill grate.

7. The powered cooking accessory of claim 1, wherein at least some of the pins are included within the power coupling.

8. The powered cooking accessory of claim 7, wherein the plurality of pins are distributed among a first group of pins and a second group of pins, the pins included within the power coupling being in the first group and the pins included within the identification element being within the second group of pins.

9. The powered cooking accessory of claim 1, wherein the identification element further includes a wireless communication element.

10. The powered cooking accessory of claim 1, wherein the device coupling comprises a plurality of pins, a first one and a second one of the pins being electrical connections, and a third one of the pin being a ground pin, the ground pin comprising the identification element and having a length thereof configured to encode the information regarding the at least one characteristic of the accessory.

11. The powered cooking accessory of claim 10, wherein the ground pin is disposed between the electrical connections.

12. A cooking system, comprising:
an oven defining an interior cavity and including a connection port on a surface of the interior cavity; and
a powered cooking accessory, including:
  a rack portion having a width spanning the cavity of the oven to slidably engage within the cavity of the oven, the rack defining a receiving portion therein with an at least partially open rack area surrounding the receiving portion;
  a body removably positioned within the receiving portion of the oven rack;
  a first electronic device coupled with the body; and
  a device coupling extending from the body and having a power coupling exposed thereon and electrically connected with the electronic device, the device coupling further having an identification element encoded with information distinguishing at least two fixed device characteristics of the accessory among a selection of accessories that may alternately be coupled with the oven;
wherein the device coupling is receivable by the connection port, the connection port providing electrical power to the power coupling, the information encoded with the identification element being communicated to the oven by connection between the device coupling and the connection port;
wherein the device coupling comprises a plurality of pins, at least some of the plurality of pins being included within the identification element and having respective lengths thereof; and
wherein the connection port determines the respective lengths of the pins included within the identification element to receive the information encoded with the identification element.

13. The cooking system of claim 12, wherein the oven includes electronic circuitry programmed to provide a selected list of cooking program options corresponding to an electronic device type included within the information communicated by the identification element.

14. The cooking system of claim 12, wherein:
the body of the powered cooking accessory defines a body type;
the electronic device of the powered cooking accessory defines one of a device type or a device component configuration; and
the information that distinguishes at least two fixed device characteristics of the accessory includes at least two of the body type, the device type, and the device component configuration.

15. The cooking system of claim 14, wherein, when the device coupling is received with the connection port, the oven provides electrical power to the electronic device through the power coupling, the oven operating within an output range at which the electrical power is provided based on one of the at least two fixed device characteristics of the accessory.

16. The cooking system of claim 12, wherein the connection port includes a power connection and at least one communication element, the connection port coupling with the power coupling when the device coupling is received within the connection port and the communication element receiving the information from the identification element.

17. The cooking system of claim 16, wherein:
at least some of the pins of the device coupling are further included within the power coupling; and
the connection port includes at least one power connection receiving the pins included within the power coupling.

18. The cooking system of claim 12, wherein the device coupling comprises a plurality of pins, a first one and a second one of the pins being electrical connections, and a third one of the pins being a ground pin, the ground pin comprising the identification element and having a length thereof configured to encode the information regarding the at least two fixed device characteristics of the accessory.

19. The cooking system of claim 18, wherein the ground pin is disposed between the electrical connections.

* * * * *